United States Patent [19]

Grimm et al.

[11] Patent Number: 4,831,787
[45] Date of Patent: May 23, 1989

[54] HONING PROCESS

[75] Inventors: Hans Grimm, Esslingen; Günter Richter, Kirchheim/Nabern, both of Fed. Rep. of Germany

[73] Assignee: Maschinenfabrik Gehring Gesellschaft mit beschränkter Haftung & Co. Kommanditgesellschaft, Ostfildern, Fed. Rep. of Germany

[21] Appl. No.: 164,175

[22] Filed: Mar. 4, 1988

[30] Foreign Application Priority Data

Mar. 7, 1987 [DE] Fed. Rep. of Germany ....... 3707326

[51] Int. Cl.$^4$ ............................................. B24B 49/04
[52] U.S. Cl. ................................ 51/165.91; 51/165.93
[58] Field of Search ......... 51/165.91, 165.93, 134.5 R, 51/281 R, 326, 327

[56] References Cited

U.S. PATENT DOCUMENTS 3,717,962 2/1973 Kusakabe et al. ................. 51/165.91
3,852,920 12/1974 Takida et al. ................. 51/165.91 X
4,505,074 3/1985 Kogure ......................... 51/165.93 X Primary Examiner—James G. Smith
Attorney, Agent, or Firm—Becker & Becker, Inc.

[57] ABSTRACT

A honing process using a honing machine as a honing arbor or spindle, the travel or stroke limit points of which can be set, and that also has a measuring device, with at least one sensor, mounted on the honing tool for the workpiece that is to be honed, as well as a regulating mechanism for controlling the honing process. The workpiece is measured during the honing process via the sensors, and during at least one measurement procedure, at least one parameter of the honing procedure is at least reduced.

16 Claims, 1 Drawing Sheet

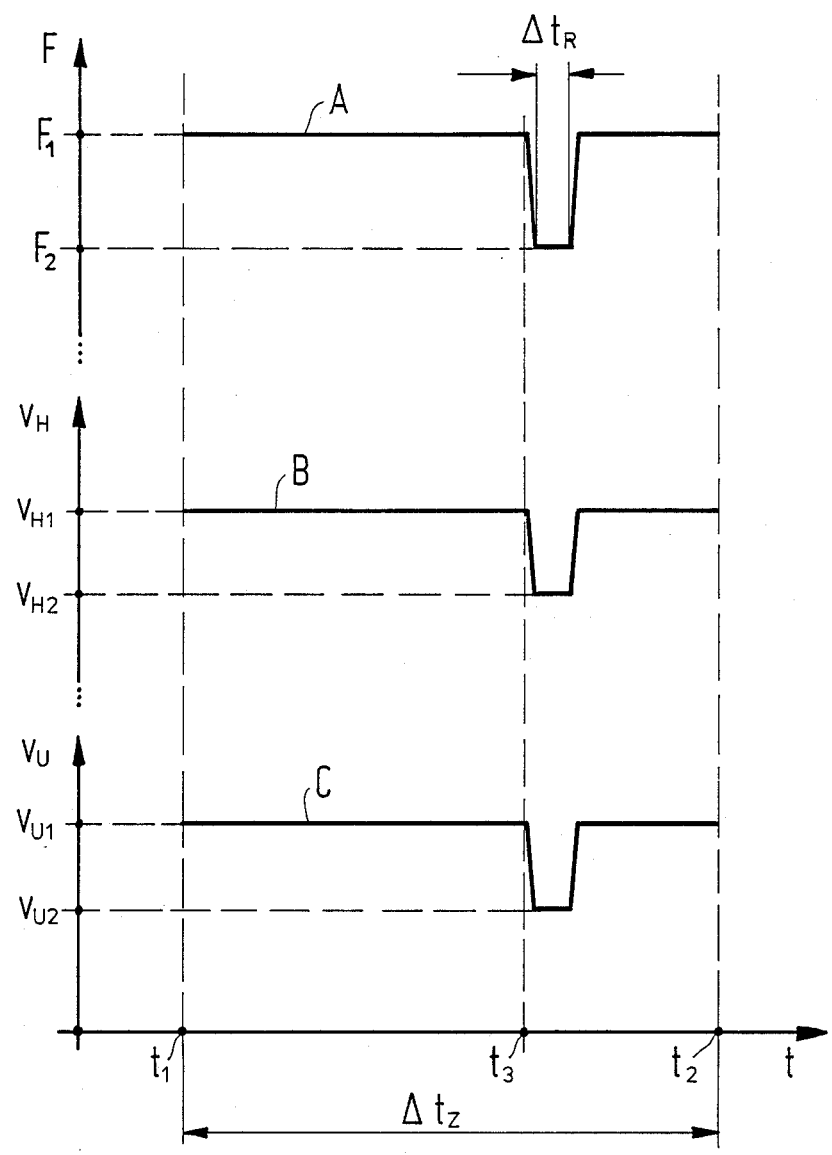

HONING PROCESS

BACKGROUND OF THE INVENTION

The present invention relates to a honing process using a honing machine that has a honing arbor or spindle, the travel or stroke limits of which can be set, and that also has a measuring device, with at least one sensor, mounted on the honing tool for the workpiece that is to be honed, as well as a regulating mechanism for controlling the honing process.

With the heretofore known methods of this type, the measuring process overlaps the honing process. The measurements are effected while the rotating honing tool is moved back and forth in the axial direction, with the honing stones being pressed against the surface of the workpiece that is to be machined. In other words, the measuring process is subjected to dynamic conditions, under which it has been proven the precision of the measuring process suffers. Furthermore, errors in measurement are greater than if the measurements are undertaken under static conditions, for example in a separate measuring station. A particular drawback is that the precision of the measuring process progressively decreases as the machining force and the cutting speed increase, resulting in a detrimental impact upon the precision of the machining. This is true because in order to achieve shorter machining times, with modern honing machines the trend is continuously toward higher cutting speeds and machining forces. However, in so doing, at the same time increasingly greater demands are made for the precision of the machining.

It is therefore an object of the present invention to provide a process of the aforementioned general type that avoids the indicated drawbacks, and assures a very high machining precision, even at high cutting speeds and/or machining forces.

BRIEF DESCRIPTION OF THE DRAWING

This object, and other objects and advantages of the present invention, will appear more clearly from the following specification in conjunction with the accompanying graph that schematically plots the inventive curve of the feeding speed F, the travel or stroke speed $v_H$, and the circumferential speed $v_U$ of the honing tool against the honing time "t" during the process of honing a workpiece.

SUMMARY OF THE INVENTION

The honing process of the present invention is characterized by the steps of measuring the workpiece during the honing process via the sensor means, and during at least one measurement procedure, at least reducing at least one parameter of the honing procedure.

By reducing the honing procedure, for example by reducing the machining force and/or the cutting speed, it is possible to undertake a measurement under quasi-static conditions, with such a measurement at least very closely approaching the precision that is possible with a static measurement. The measurements obtained with the inventive process are utilized to regulate the honing process, as a result of which a very high machining precision is achieved, even with high cutting speeds and/or machining forces.

During the preferably brief time in which the honing process is reduced, the workpiece is measured, for example, in several planes, and its shape is determined. When deviations occur from the desired shape, correction signals are formed in a known manner and lead to an alteration of the machining stroke of the honing machine. The machining stroke is increased, decreased, or shifted by preferably independent adjustment of the two reversing limit points, in a manner known, for example, from German Offenlegungsschrift No. 25 59 949.

Pursuant to a further feature of the present invention, it is also possible in an advantageous manner to form correction values by comparing the measurements obtained during the reduced honing process with the measurements determined just prior to the reduction; with these correction values, the subsequent measurements that are determined during the full honing process can be corrected.

To reduce the honing process, the pressure of the honing stones against the workpiece is reduced by the feed mechanism to such an extent that the workpiece again assumes its stress-relieved shape. At the same time, the stroke or travel speed can be advantageously reduced, and in particular preferably to below 12 m/min. This enables a good determination of the individual measurements at, for example, measuring locations on the workpiece that are axially spaced from one another.

Pursuant to a particularly advantageous preferred embodiment of the present invention, the rotational speed of the workpiece is also reduced. This speed is preferably reduced to such an extent that the angle of the machining passes determined by the stroke speed and the rotational speed, the so-called cross-cut angle, remains unchanged.

Further specific features of the present invention will be described in detail subsequently.

DESCRIPTION OF PREFERRED EMBODIMENTS

Referring now to the drawing in detail, the time point t indicates, for example, the start, and $t_2$ the conclusion, of the process of honing a workpiece. In other words, the time interval indicated by $\Delta t_Z$ is the cutting time in which material is removed from the workpiece by honing.

With the heretofore known methods, the machining or cutting is effected at an essentially constant travel and circumferential speed. The number of strokes and the rotational speed are preset for a specific line of workpieces, with the relationship of the travel and overlapping speed being selected in such a way that an overlap angle of the machining traces or passes of approximately 45° to 70° results.

The feeding force with which the honing stones are pressed against the surface of the workpiece can also be constant with the heretofore known methods. This force can also be adapted to the machining progress, with the goal of constantly achieving an optimal machining. In this connection, it is also known to operate with a pulsating pressure.

In order to simplify the description and illustration of the present invention, the following description will proceed from an initially constant pressure of the honing stones, although it is to be understood that the invention is not limited thereto.

Thus, as indicated in the graph, the honing process initially takes place at a constant feeding force $F_1$ (curve A), a constant travel or stroke speed $v_{H1}$ (curve B), and a constant circumferential speed $v_{U1}$ (curve C). Simultaneously with the beginning of the cutting, the workpiece can be continuously or periodically measured in a known manner via a honing too that is equipped with a sensor. However, at the cutting speed and pressure of the honing stones that are necessary for a decent cutting, the measured values obtained in the aforementioned fashion are not very precise. This is based on the one hand on the fact that the time for determining a measurement in a given plane of the workpiece is not sufficient due to the fact that the sensor is moved over the surface of the workpiece at the cutting speed. Another reason for the imprecision of the measurement is that the workpiece deforms elastically under the effect of the pressure of the honing stones, which pressure acts in particular radially. It is therefore not possible to obtain a reliable indication of the shape and a precise measurement of the workpiece.

Therefore, after a predetermined honing time within the cutting time span, for example at the time point $t_3$ or at a predetermined intermediate point prior to the final dimension of the workpiece being achieved, the present invention proposes reducing the feeding force $F_1$ abruptly to a low level $F_2$, and then carrying out a measurement. The time span designated $\Delta t_R$ in the graph and during which time the feeding force is reduced, is selected in such a way that at least one measuring procedure can be carried out in a known manner for determining the momentary shape and/or size of the workpiece.

The extent of the reduction of the feeding force is preferably such that the deformation of the workpiece is eliminated, yet the honing stones still just rest against the surface of the workpiece under a slight pressure.

At the same time that the feeding force is reduced, it is further proposed pursuant to an additional advantageous feature of the present invention to reduce the stroke speed $v_{H1}$ and the circumferential speed $v_{U1}$ at the time point $t_3$, and to maintain these speeds during the time span $\Delta t_R$ at a low level, namely $v_{H2}$ and $v_{U2}$, as shown in the curves B and C. The stroke speed $v_{H1}$ is preferably reduced to less than 12 m/min.

Pursuant to a particularly advantageous embodiment of the present invention, the reduction of the stroke speed $v_{H1}$ and the circumferential speed $v_{U1}$ is effected in such a way that the relationship of the two speeds to one another remains unchanged, so that no alteration of the overlap angle of the machining passes occurs. It is to be understood, of course, that it might be advantageous in individual situations to reduce only the stroke speed and/or the circumferential speed, for example when no deformation of the workpiece results from the feeding force, for example with a particularly sturdy and uniform workpiece.

The reduction of the honing procedure for the time period $\Delta t_R$ for carrying out a measuring procedure can, as illustrated in the graph, be undertaken one time within the time span $\Delta t_Z$, preferably when approximately ⅔ of the material that is to be removed has been machined from the workpiece. The very precise measurements determined with the present invention during the time span $\Delta t_R$ are conveyed from the measuring device to a regulating unit, generally a computer, that is connected with the machine control mechanism. The computer processes the measurements in a known manner, with in particular deviations in the shape of the measured workpiece relative to a predetermined desired shape being determined and leading to an alteration of the machining stroke of the honing machine, as a result of which during the further progress of the machining, errors in the shape of the workpiece are eliminated.

Since the preliminary preparation of workpieces is generally accomplished on automatic machines, it can be assumed that errors in shape that occur during the preparation of successive workpieces tend to be approximately the same, as a result of which errors in shape due to wear are also generated with the same tendency with the honing tool. Therefore, the correction of the machining stroke is preferably initially retained. In other words, the correction associated with the error is stored until a new or different error in shape in one of the subsequent workpieces is determined by the measuring device.

However, it is also possible, after each workpiece, to withdraw the correction that was undertaken. In other words, after each workpiece the machining stroke again assumes a predetermined starting position. This method of proceeding is advantageous when the workpieces that are supplied to the honing machine are not turned out the same.

In this case it could also be advantageous to already reduce the honing operation at an earlier time point within the cutting time span in order in a timely manner to adjust the machining stroke, via a precise measurement, in conformity with the error in shape, from the preliminary preparation, that is to be corrected.

It is furthermore also possible pursuant to the present invention to reduce the honing operation several times within the cutting time span of a workpiece in order to undertake a precise measurement of that workpiece.

Pursuant to a particularly advantageous embodiment of the present invention, the measurements that are determined immediately prior to the reduction of the honing process during the time point $t_3$ are stored and are compared in the computer with the very precise measurements that are determined during the reduced honing process. The differential values represent a value for the errors in measurement that affect the measurements determined during the full honing operation in the respective measuring planes. The computer adds the differential values to the measurements that are continuously obtained during the complete honing operation, and forms corrected measurements.

Thus, during the entire honing operation, it is possible to continuously and very precisely determine the shape of the workpiece at any given time, and, when a deviation from the prescribed desired shape occurs, to immediately effect an adjustment by altering the machining stroke.

Also possible by proceeding in this manner is a very precise control of the size of the workpiece, thus permitting very close manufacturing tolerances to be observed.

It should be noted that the control of the size is advantageously effected in a known manner via a comparison with a control ring that has the desired size. This comparison is preferably carried out for each machined workpiece.

Finally, pursuant to yet another proposal of the present invention, it is also possible to use the sensor that is mounted on the honing tool to carry out a measurement of the workpiece in the honing station prior to and/or after the honing process. In this case, the honing stones are in a retracted position and do not rest against the workpiece.

With such a preliminary measurement, it is possible, for example, to determine in an advantageous manner the error in shape of a workpiece coming from a preliminary preparation, and to adjust the honing process, and in particular the machining stroke, in conformity therewith prior to the start of honing.

A post measurement of the workpiece is particularly advantageous if the determined measurements, which represent the actual shape and size of the final-honed workpiece, are provided for a mechanical data processing and are analyzed.

Such an analysis can in a known way include, for example, assignment to size groups, projection screens, and/or expression of the shape of the workpiece, calculation of static parameters for controlling quality, storage of data in a data base for further processing of the data externally of the honing machine, etc.

The present invention is, of course, in no way restricted to the specific disclosure of the specification and drawing, but also encompasses any modifications within the scope of the appended claims.

What we claim is:

1. A honing process using a honing machine that has a honing arbor or spindle, the travel or stroke limit points of which can be set, and that also has a measuring device, with sensor means, mounted on the honing tool for the workpiece that is to be honed, as well as a regulating mechanism for controlling the honing process; said process including the steps of:

measuring said workpiece during the honing process via said sensor means;

during at least one measurement procedure, at least reducing at least one parameter of the honing procedure; and during at least one measurement procedure, reducing the feeding force of said honing tool.

2. A honing process according to claim 1, which includes the step of reducing said feeding force to such an extent that deformation of said workpiece is eliminated.

3. A honing process according to claim 2, which includes the step, during at least one measurement procedure, of reducing at least one of the stroke speed and the circumferential speed of said honing tool.

4. A honing process using a honing machine that has a honing arbor or spindle, the travel or stroke limit points of which can be set, and that also has measuring device, with sensor means, mounted on the honing tool for the workpiece that is to be honed, as well as a regulating mechanism for controlling the honing process; said process including the steps of:

measuring said workpiece during the honing process via said sensor means;

during at least one measurement procedure, at least reducing at least one parameter of the honing procedure;

during at least one measurement procedure, of reducing at least one of the stroke speed and the circumferential speed of said honing tool; and reducing said stroke speed to below 12 m/min.

5. A honing process using a honing machine that has a honing arbor or spindle, the travel or stroke limit points of which can be set, and that also has a measuring device, with sensor means, mounted on the honing tool for the workpiece that is to be honed, as well as a regulating mechanism for controlling the honing process; said process including the steps of:

measuring said workpiece during the honing process via said sensor means;

during at least one measurement procedure, at least reducing at least one parameter of the honing procedure;

during at least one measurement procedure, of reducing at least one of the stroke speed and the circumferential speed of said honing tool; and reducing both said stroke speed and said circumferential speed in such a way that the relationship of these two speeds to one another remains unchanged.

6. A honing process according to claim 5, in which said honing procedure takes place during a prescribed cutting time period, and said at least one parameter of said honing procedure is reduced during said cutting time period after a fixed honing time has elapsed.

7. A honing process according to claim 6, in which said at least one parameter of said honing procedure is reduced after a predetermined amount of material is honed from said workpiece, but before the final dimensions of the latter are reached.

8. A honing process using a honing machine that has a honing arbor or spindle, the travel or stroke limit points of which can be set, and that also has a measuring device, with sensor means, mounted on the honing tool for the workpiece that is to be honed, as well as a regulating mechanism for controlling the honing process; said process including the steps of:

measuring said workpiece during the honing process via said sensor means; and during at least one measurement procedure, at least reducing at least one parameter of the honing procedure, said honing procedure takes place during a prescribed cutting time period, and said at least one parameter of said honing procedure is reduced during said cutting time period after a fixed honing time has elapsed;

said at least one parameter of said honing procedure is reduced after a predetermined amount of material is honed from said workpiece, but before the final dimensions of the latter are reached, said at least one parameter of said honing procedure is reduced after approximately ⅔ of the material that is to be removed is honed from said workpiece.

9. A honing process according to claim 8, in which said at least one parameter of said honing procedure is reduced at least once for a predetermined time span within said cutting time period.

10. A honing process according to claim 9, which includes the step, during said predetermined time span, of reducing at least one of the stroke speed and the circumferential speed of said honing tool to a low level.

11. A honing process according to claim 10, which includes the steps of: during the time said at least one parameter of said honing procedure is reduced, determining the shape and/or the size of said workpiece; and utilizing this determination to control the honing process.

12. A honing process using a honing machine that has a honing arbor or spindle, the travel or stroke limit points of which can be set, and that also has a measuring device, with sensor means, mounted on the honing tool for the workpiece that is to be honed, as well as a regulating mechanism for controlling the honing process; said process including the steps of:

measuring said workpiece during the honing process via said sensor means; and during at least one measurement procedure, at least reducing at least one parameter of the honing procedure;

said honing procedure takes place during a prescribed cutting time period, and said at least one parameter of said honing procedure is reduced during said cutting time period after a fixed honing time has elapsed, said at least one parameter of said honing procedure is reduced at least once for a predetermined time span within said cutting time period, said at least one parameter of said honing procedure is reduced several times within said cutting time period.

13. A honing process according to claim 12, which includes the steps of: storing measurements determined prior to the time said at least one parameter of said honing procedure is reduced, and comparing these stored measurements with measurements determined during the time said at least one parameter is reduced to form differential values.

14. A honing process according to claim 13, which includes the step of utilizing said differential values to correct measurements obtained during full honing operations when said at least one parameter is not reduced.

15. A honing process according to claim 14, which includes the step of utilizing corrected measurements to control said honing process.

16. A honing process according to claim 15, which includes the step of using said sensor means to selectively measure said workpiece in a honing station before and/or after said honing procedure.

* * * * *